April 1, 1952  B. G. ANDERSON  2,591,393
ENGINE MOUNT ATTACHMENT
Filed Oct. 4, 1949  3 Sheets-Sheet 1
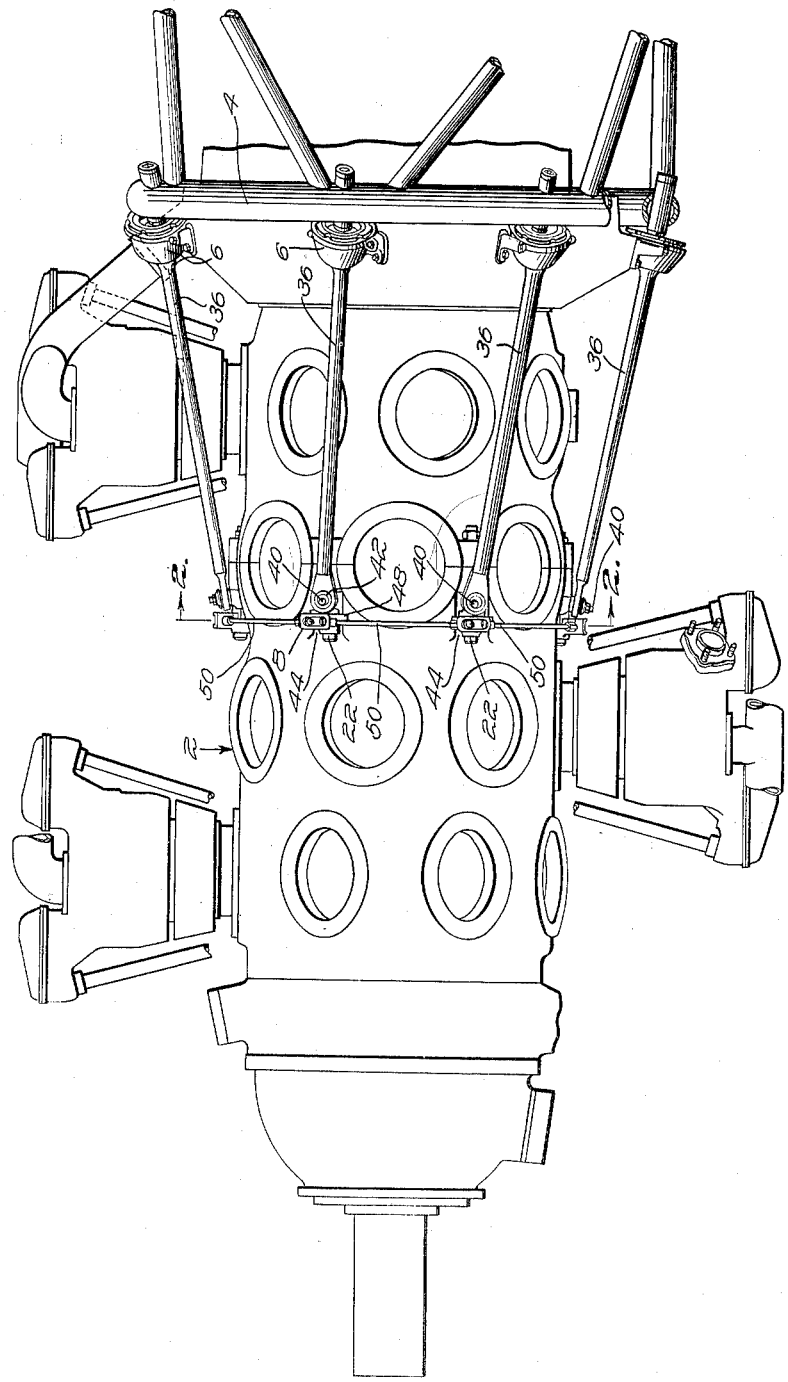

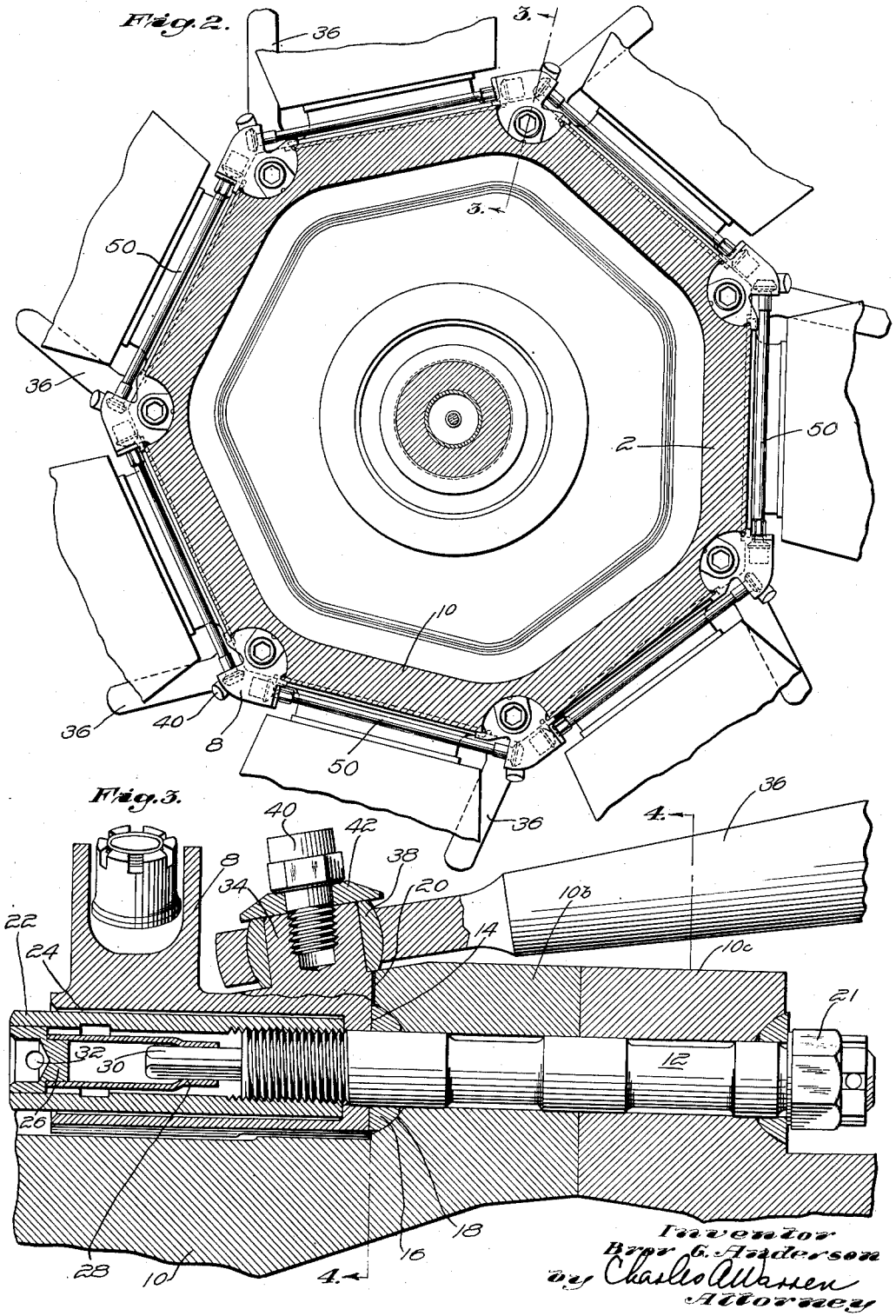

April 1, 1952  B. G. ANDERSON  2,591,393
ENGINE MOUNT ATTACHMENT
Filed Oct. 4, 1949  3 Sheets-Sheet 3
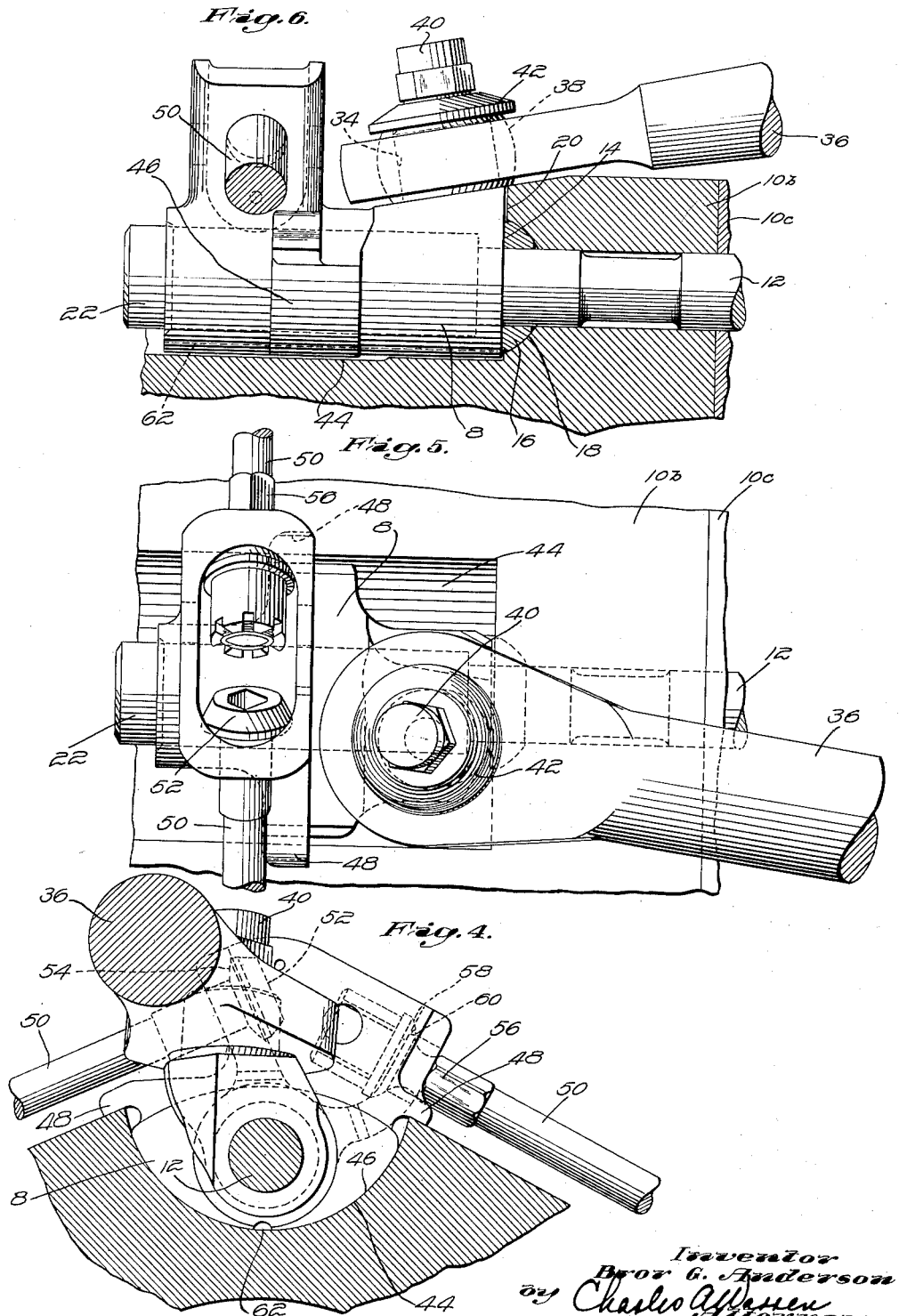

Patented Apr. 1, 1952

2,591,393

UNITED STATES PATENT OFFICE 2,591,393

ENGINE MOUNT ATTACHMENT

Bror G. Anderson, South Glastonbury, Conn., assignor to United Aircraft Corporation, East Hartford, Conn., a corporation of Delaware Application October 4, 1949, Serial No. 119,546

13 Claims. (Cl. 121—194)

This invention relates to the attachment of engine mounts to the crankcase of a radial engine.

Engines of the radial type for aircraft have become increasingly high powered and thus increasingly heavier with the result that the resilient mounts that support the engine within the carrying structure or aircraft frame require more rugged attachment to the engine crankcase. A major problem has been the excessive local stress conditions developing in the crankcase sections by the attachment of the engine mounts since these sections are already highly stressed in the normal operation of the engine. A feature of this invention is the attachment of the mounts to the crankcase in such a way that the stresses on the crankcase resulting from the attachment of the mount or from its function in supporting the engine will be almost entirely compressive stresses.

More specifically a feature of the invention is the attachment of a series of engine mounts around the engine at least in part by a surrounding ring (which may be made up of interconnected links) which extends around the crankcase and holds the engine mounts in position against the outer wall of the crankcase.

Other objects and advantages of the invention will be apparent from the following detailed description taken in connection with the accompanying drawings in which:

Fig. 1 is a side elevation of the engine with the mounts thereon;

Fig. 2 is a sectional view substantially on line 2—2 of Fig. 1;

Fig. 3 is a sectional view substantially on line 3—3 of Fig. 2;

Fig. 4 is a sectional view substantially on line 4—4 of Fig. 3;

Fig. 5 is a plan view of the device of Fig. 4; and

Fig. 6 is an elevation of the device with parts of the crankcase broken away.

The arrangement of the engine mounts is shown in connection with a four-row multiple bank engine in which the engine 2 is supported within a carrying frame 4 by engine mounts 6 which extend between the carrying frame and supporting brackets 8 attached to the engine crankcase. The engine structure is conventional and the carrying ring and supporting engine mount may also be conventional. The invention resides in the attachment of the engine mount brackets to the engine crankcase and the attachment of the engine mount to these brackets.

With reference now to Figs. 2 and 3, the engine crankcase 10 is made up in several sections including sections 10b and 10c which are held together by suitable holding bolts or studs 12. These studs 12 function to clamp the engine mount bracket 8 against a radial surface 14 on a ring 16 which engages a corresponding shaped groove 18 in a radially extending wall 20 on the crankcase section 10b. The stud 12 has at one end a nut 21 and the stud extends through flanges on the crankcase sections 10b and 10c with its threaded end remote from the nut 21 engaged by an elongated nut 22 received within a recess 24 in the mount bracket. The nut 22 is locked against turning on the stud by any suitable mechanism which may be the locking sleeve 26 which fits within the end of the nut 22 and has a rectangular or other shaped end 28 engaging with a corresponding shaft projection 30 on the stud. The outer end of the sleeve 26 is pinned or wired through the opening 32 to prevent its turning with reference to the nut 22.

The bracket 8 has a boss 34 thereon extending substantially radially outward from the bracket to engage with and support the forward end of the arm 36 forming a part of the engine mount. This arm may have therein a ring 38 with a spherical outer surface which fits in the arm 36. The ring in turn fits over the boss 34 and is held in position on the boss by a screw 40 and washer 42.

Each mount bracket in addition to being supported in axial position by the stud 12 and ring 16 is supported radially by an arcuate surface 44 provided by the crankcase. The engine mount bracket has a correspondingly shaped surface 46 and is also provided with projecting lugs or ears 48 which overlie the outer surface of the crankcase and prevent the bracket from turning on the axis of the stud 12 or on the center of curvature of the arcuate surface. The brackets are held in secure engagement with the surfaces 44 by links extending between adjacent brackets, these links being in the form of bolts 50 which when entirely assembled form a ring extending around and spaced from the crankcase, as best shown in Fig. 2.

Each bolt 50 has a spherically-surfaced head 52 engaging with a similarly shaped supporting surface 54 on the bracket and the other end of the bolt is engaged by a nut 56 having a spherical surface 58 engaging with a similarly shaped surface 60 on the bracket. By tightening the bolts 50 the brackets are held securely against the crankcase and apply a load thereon in a radial direction which results in the application of compressive stresses to the crankcase. The arcuate surface 46 is located in the radial plane which includes the bolts 50 as best shown in Fig. 6 and for the purpose of drainage the surface 46 may have a groove 62 therein, as clearly indicated in Fig. 4.

When the engine has been mounted in the supporting structure, the engine mounts extend downwardly to engage with the mounting brackets 8 and the load on the engine crankcase resulting from the weight of the engine or from the other forces acting on the engine will be transmitted in compression both radially or axially into the crankcase.

It is to be understood that the invention is not limited to the specific embodiment herein illustrated and described, but may be used in other ways without departure from its spirit as defined by the following claims.

I claim:

1. An attachment for holding mounting brackets to an engine including a crankcase, a series of angularly spaced mounting brackets arranged in a ring around the crankcase, and bolts extending circumferentially around the crankcase between adjacent brackets and engaging with said brackets such that by tightening the bolts the brackets are held radially securely against the crankcase.

2. An attachment for holding mounting brackets to an engine including a crankcase, a series of angularly spaced mounting brackets arranged in a ring around the crankcase, and tensioning means extending circumferentially around the crankcase between adjacent brackets and engaging with said brackets such that by tightening the tensioning means the brackets are held radially securely against the crankcase.

3. An attachment for holding mounting brackets to an engine including a crankcase, a series of angularly spaced mounting brackets arranged in a ring around the crankcase, and bolts extending circumferentially around the crankcase between adjacent brackets and engaging with said brackets for holding them radially against the crankcase, said crankcase having arcuate surfaces thereon and said bracket having similarly shaped surfaces engageable therewith.

4. An attachment for holding mounting brackets to an engine including a crankcase, a series of angularly spaced mounting brackets arranged in a ring around the crankcase, and bolts extending circumferentially around the crankcase in spaced relation thereto between adjacent brackets and engaging with said brackets such that by tightening the bolts the brackets are held radially securely against the crankcase.

5. An attachment for holding mounting brackets to an engine including a crankcase, a series of angularly spaced mounting brackets arranged in a ring around the crankcase, and bolts extending circumferentially around the crankcase between adjacent brackets and engaging with said brackets such that by tightening the bolts the brackets are held radially securely against the crankcase, and other axially extending bolts, at least one for each bracket, for holding the brackets against axial movement with respect to the crankcase.

6. An attachment for holding mounting brackets to an engine including a crankcase, a series of angularly spaced mounting brackets arranged in a ring around the crankcase, and bolts extending circumferentially around the crankcase between adjacent brackets and engaging with said brackets for holding them radially against the crankcase, and other axially extending bolts, at least one for each bracket, for holding the brackets against axial movement with respect to the crankcase there being cooperating interengaging radial surfaces on the bracket and the crankcase.

7. An attachment for holding mounting brackets to an engine including a crankcase, a series of angularly spaced mounting brackets arranged in a ring around the crankcase, and bolts extending circumferentially around the crankcase between adjacent brackets and engaging with said brackets for holding them radially against the crankcase, said crankcase having arcuate surfaces thereon and said bracket having similarly shaped surfaces engageable therewith, said bracket having lugs thereon engageable with the crankcase for preventing pivotal movement of the bracket about the axis of the arcuate surfaces.

8. An attachment for holding mounting brackets on an engine including a crankcase made up of annular sections in endwise engagement, bolts holding adjacent annular sections together, a series of angularly spaced mounting brackets arranged in a ring around the crankcase and connecting bolts extending circumferentially around the crankcase in spaced relation thereto and forming connections between adjacent brackets for holding the brackets radially against the crankcase, certain of said first-mentioned bolts engaging the brackets to prevent axial movement of said brackets on the crankcase.

9. An attachment for holding mounting brackets on an engine including a crankcase made up of annular sections in endwise engagement, bolts holding adjacent annular sections together, a series of angularly spaced mounting brackets arranged in a ring around the crankcase in spaced relation thereto and forming connections between adjacent brackets for holding the brackets radially against the crankcase, certain of said first-mentioned bolts engaging the brackets to prevent axial movement of said brackets on the crankcase, said certain bolts extending axially through said brackets and each of said brackets having an arcuate surface engageable with the crankcase, said surface having its center of curvature spaced from the axis of the bolt.

10. In the support of a radial engine in a supporting structure, an engine crankcase, engine mounts extending between said crankcase and the supporting structure and angularly spaced brackets positioned around the crankcase and connecting said mounts to said crankcase, the latter having axially extending surfaces with which said brackets engage, means for connecting said brackets to the crankcase to prevent axial movement, and means extending around said crankcase for connecting said angularly spaced brackets together to hold said brackets radially in contact with the surfaces on the crankcase.

11. In the support of a radial engine in a supporting structure, an engine crankcase, engine mounts extending between said crankcase and the supporting structure and angularly spaced brackets positioned around the crankcase and connecting said mounts to said crankcase, the latter having axially extending surfaces with which said brackets engage, axially extending bolts holding said brackets against the crankcase to prevent axial movement, and means extending around said crankcase and connecting said brackets together to hold said brackets radially in contact with the surfaces on the crankcase.

12. In the support of a radial engine in a supporting structure, an engine crankcase, engine mounts extending between said crankcase and the supporting structure and angularly spaced brackets positioned around the crankcase and connecting said mounts to said crankcase, the latter having angularly spaced axially extending surfaces being arcuate and the associated bracket having a similarly shaped surface, and means extending around said crankcase and connecting said brackets together to hold said brackets radially in contact with the surfaces on the crankcase.

13. In the support of a radial engine in a supporting structure, an engine crankcase, engine mounts extending between said crankcase and the supporting structure and angularly spaced brackets positioned around the crankcase and connecting said mounts to said crankcase, the latter having angularly spaced axially extending surfaces being arcuate and the associated bracket having a similarly shaped surface, and bolts extending circumferentially around the crankcase between adjacent brackets and engaging with said brackets for holding them radially against the crankcase.

BROR G. ANDERSON.

REFERENCES CITED

The following references are of record in the file of this patent:

UNITED STATES PATENTS

| Number | Name | Date |
|---|---|---|
| 1,681,219 | Caminez | Aug. 21, 1928 |
| 1,933,246 | Edwards | Oct. 31, 1933 |
| 1,933,286 | Tibbetts | Oct. 31, 1933 |